(12) United States Patent
Lee

(10) Patent No.: US 11,489,334 B2
(45) Date of Patent: Nov. 1, 2022

(54) EARTH LEAKAGE BREAKER HAVING LEAKAGE CURRENT LIMITING FUNCTION

(71) Applicant: VISION TECH. INC, Busan (KR)

(72) Inventor: Ho Seok Lee, Busan (KR)

(73) Assignee: VISION TECH. INC, Busan (KR)

( * ) Notice: Subject to any disclaimer, the term of this patent is extended or adjusted under 35 U.S.C. 154(b) by 0 days.

(21) Appl. No.: 17/077,348

(22) Filed: Oct. 22, 2020

(65) Prior Publication Data

US 2021/0408785 A1 Dec. 30, 2021

(30) Foreign Application Priority Data

Jun. 26, 2020 (KR) .................. 10-2020-0078493

(51) Int. Cl.
*H02H 9/02* (2006.01)
*H01H 71/08* (2006.01)
*H01H 71/02* (2006.01)

(52) U.S. Cl.
CPC .............. *H02H 9/02* (2013.01); *H01H 71/02* (2013.01); *H01H 71/08* (2013.01)

(58) Field of Classification Search
CPC ........... H02H 9/02; H01H 71/02; H01H 71/08
USPC ................................................. 361/93, 93.9
See application file for complete search history.

(56) References Cited

U.S. PATENT DOCUMENTS

| | | | |
|---|---|---|---|
| 6,141,197 A * | 10/2000 | Kim | H02H 1/0015 361/93.6 |
| 9,601,917 B2 | 3/2017 | An et al. | |
| 9,960,519 B2 | 5/2018 | Lee | |
| 2002/0135958 A1* | 9/2002 | Germain | H01H 83/04 361/42 |
| 2009/0091869 A1* | 4/2009 | Huang | H01H 83/04 361/42 |
| 2012/0152705 A1* | 6/2012 | Nakano | H01H 73/20 200/293 |

FOREIGN PATENT DOCUMENTS

| | | |
|---|---|---|
| JP | 2015-531146 A | 10/2015 |
| KR | 200309574 Y1 * | 1/2003 |
| KR | 200309574 Y1 * | 4/2003 |
| KR | 20-2011-0004010 A | 4/2011 |
| KR | 10-1404806 B1 | 6/2014 |
| KR | 10-2015-0068208 A | 6/2015 |
| KR | 10-1812695 B | 12/2017 |

OTHER PUBLICATIONS

Korean office action dated Nov. 8, 2021 for Korean Application No. 10-2020-0078493.
Korean office action dated Jun. 20, 2022 for Korean Application No. 10-2020-0078493.

* cited by examiner

*Primary Examiner* — Thienvu V Tran
*Assistant Examiner* — Sreeya Sreevatsa
(74) *Attorney, Agent, or Firm* — Insight Law Group, PLLC; Seung Lee

(57) ABSTRACT

The present disclosure relates to an earth leakage breaker having a leakage current limiting function, and the earth leakage breaker is provided to implement leakage current limiting parts at both ends of an earth leakage breaker part so that both an input terminal and an output terminal are each provided with the leakage current limiting function to increase leakage current limiting efficiency.

10 Claims, 3 Drawing Sheets

EARTH LEAKAGE BREAKER HAVING LEAKAGE CURRENT LIMITING FUNCTION

CROSS-REFERENCE TO RELATED APPLICATION(S)

This application claims priority from Korean Patent Application No. 10-2020-0078493, filed on Jun. 26, 2020, in the Korean Intellectual Property Office, the disclosure of which is incorporated herein by reference in its entirety.

BACKGROUND

1. Field

The following description relates to an earth leakage breaker which blocks power when an unbalanced current of a power supply due to a leakage current exceeds a predetermined value, and more specifically, to an earth leakage breaker having a leakage current limiting function.

2. Description of Related Art

In Korean Application Patent No. 10-1404806 (May 30, 2014) previously filed and registered by the applicant of the present disclosure, a power circuit breaker with electric shock prevention function which prevents electric shock by connecting a flat-shaped conductor having a cross-sectional area larger than a cross-sectional area of a wire to an output terminal connected to a transmission/distribution path of an electrical facility to reduce a current flowing through a human body which comes into contact with leaking electricity is suggested.

However, this technology prevents electric shock by limiting a leakage current using an area difference between conductor electrodes, and has a leakage current limiting function only at the output terminal, and is not provided with a leakage current limiting function at an input terminal.

Accordingly, the inventor of the present disclosure has conducted research on an earth leakage breaker with an improved structure in which leakage current limiting parts at both ends of an earth leakage breaker part are implemented to have a leakage current limiting function at both the input terminal and the output terminal, and thus leakage current limiting efficiency can be increased.

PRIOR-ART DOCUMENT

Korean Application Patent No. 10-1404806 (May 30, 2014)

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description is directed to providing an earth leakage breaker with an improved structure in which leakage current limiting parts at both ends of an earth leakage breaker part are implemented to have a leakage current limiting function at both an input terminal and an output terminal, and thus leakage current limiting efficiency may be increased.

In one general aspect, an earth leakage breaker having a leakage current limiting function includes an input terminal to which an input-side wire is connected; an output terminal to which an output-side wire is connected; an earth leakage breaker part having both ends to which the input terminal and the output terminal are respectively connected, and configured to block the electrical connection between the input terminal and the output terminal when an overcurrent flows; an input-side leakage current limiting part disposed between the input terminal and the earth leakage breaker part to limit an input-side leakage current; and an output-side leakage current limiting part disposed between the earth leakage breaker part and the output terminal to limit an output-side leakage current According to an additional aspect of the present disclosure, the input-side leakage current limiting part may include an input-side conductor area expansion plate electrically connected to a neutral line input terminal to expand a conductor area of the neutral line input terminal to limit a leakage current.

According to an additional aspect of the present disclosure, the output-side leakage current limiting part may include an output-side conductor area expansion plate electrically connected to a neutral line output terminal to expand a conductor area of the neutral line output terminal to limit a leakage current.

According to an additional aspect of the present disclosure, the earth leakage breaker part may include an earth leakage breaker switch protected by a silicon film.

According to an additional aspect of the present disclosure, the earth leakage breaker having a leakage current limiting function may include an enclosure provided with a lattice type accommodation groove configured to accommodate the earth leakage breaker part, and the input-side leakage current limiting part and the output-side leakage current limiting part disposed at both ends of the earth leakage breaker part in separated accommodation spaces so that the input-side leakage current limiting part and the output-side leakage current limiting part do not electrically affect the earth leakage breaker part.

Other features and aspects will be apparent from the following detailed description, the drawings, and the claims.

Figure 1:
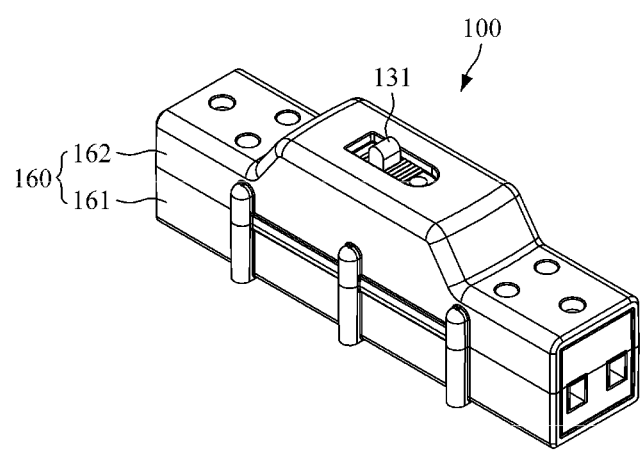
FIG. 1 is an exterior perspective view illustrating the configuration of one embodiment of an earth leakage breaker having a leakage current limiting function according to the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, the present disclosure will be described in detail to be easily understood and reproduced by those skilled in the art through preferable embodiments described with reference to the accompanying drawings. Although specific embodiments are exemplified in the drawings and detailed descriptions related thereto are disclosed, the specific embodiments and the detailed descriptions do not limit various embodiments of the present disclosure to a specific form.

When specific descriptions of known functions or configurations related to the description of the present disclosure are determined to unnecessarily obscure principles of the present disclosure, detailed descriptions thereof will be omitted.

When predetermined components are mentioned as being "connected," "coupled," or "connected" to other components, the components may be directly connected or connected to other components, but it should be understood that additional components may be present therebetween.

On the other hand, when the predetermined components are mentioned as being "directly connected," "directly coupled," or "directly connected" to other components, it should be understood that no additional components are present between the above-described components.

Figure 2:
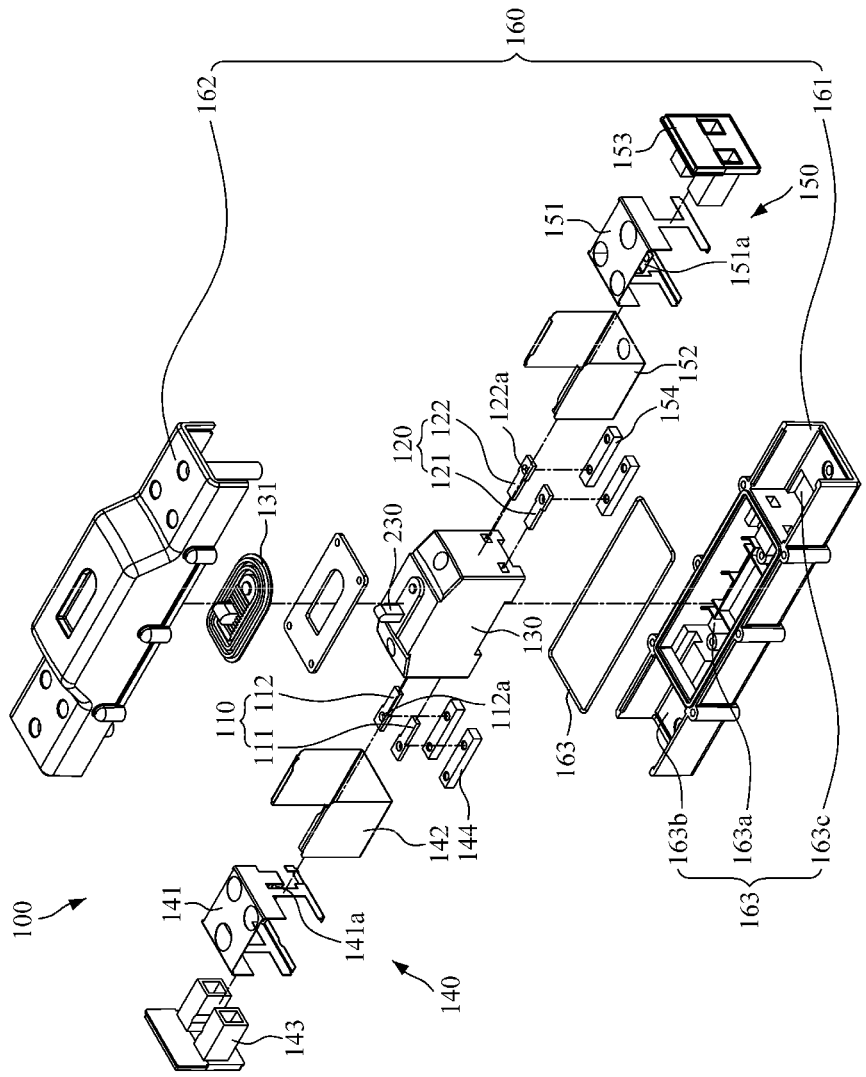
FIG. 2 is an exploded perspective view illustrating the configuration of one embodiment of the earth leakage breaker having the leakage current limiting function according to the present disclosure.

FIG. 1 is an exterior perspective view illustrating the configuration of one embodiment of an earth leakage breaker having a leakage current limiting function according to the present disclosure, and FIG. 2 is an exploded perspective view illustrating the configuration of one embodiment of the earth leakage breaker having the leakage current limiting function according to the present disclosure.

As shown in FIGS. 1 and 2, an earth leakage breaker 100 provided with a leakage current limiting function according to this embodiment includes an input terminal 110, an output terminal 120, an earth leakage breaker part 130, an input-side leakage current limiting part 140, and an output-side leakage current limiting part 150.

An input-side wire is connected to the input terminal 110. The input terminal 110 includes a phase voltage line input terminal 111 connected to a phase voltage line (an R phase, an S phase, or a T phase) of the input-side wire, and a neutral line input terminal 112 connected to a neutral line (an N phase) of the input-side wire.

An output-side wire is connected to the output terminal 120. The output terminal 120 includes a phase voltage line output terminal 121 connected to a phase voltage line (an R phase, an S phase, or a T phase) of the output-side wire, and a neutral line output terminal 122 connected to a neutral line (an N phase) of the output-side wire.

The earth leakage breaker part 130 has both ends to which the input terminal 110 and the output terminal 120 are respectively connected, and blocks the electrical connection between the input terminal 110 and the output terminal 120 when an overcurrent flows. An earth leakage breaker circuit 200 which blocks power when an unbalanced current of the power supply due to a leakage current exceeds a predetermined value is mounted in the earth leakage breaker part 130.

Figure 3:
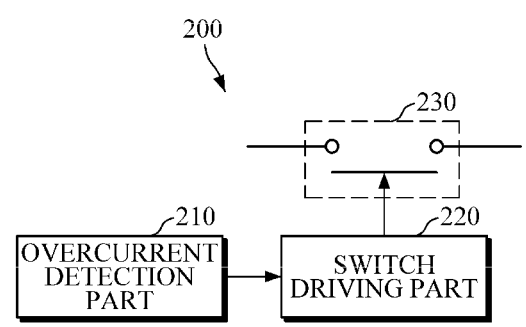
FIG. 3 is a block diagram illustrating the configuration of one embodiment of an earth leakage breaker circuit of the earth leakage breaker having the leakage current limiting function according to the present disclosure.

FIG. 3 is a block diagram illustrating the configuration of one embodiment of an earth leakage breaker circuit of the earth leakage breaker having the leakage current limiting function according to the present disclosure. The earth leakage breaker circuit 200 according to this embodiment includes an overcurrent detection part 210, a switch driving part 220, and an earth leakage breaker switch 230

The overcurrent detection part 210 detects an overcurrent by measuring whether the unbalanced current of the power supply due to the leakage current exceeds a predetermined value. The switch driving part 220 is driven when the overcurrent is detected by the overcurrent detection part 210.

The earth leakage breaker switch 230 is switched by driving the switch driving part 220 to block the electrical connection between the input terminal 110 and the output terminal 120. The earth leakage breaker switch 230 is protected by a silicon film 131 and thus may be implemented in a way that moisture is prevented from being introduced into the earth leakage breaker part 130.

The input-side leakage current limiting part 140 is disposed between the input terminal 110 and the earth leakage breaker part 130 to limit an input-side leakage current. In this case, the input-side leakage current limiting part 140 includes an input-side conductor area expansion plate 141.

The input-side conductor area expansion plate 141 is electrically connected to the neutral line input terminal 112 to expand a conductor area of the neutral line input terminal 112, thereby limiting a leakage current. Reference numerals 141a and 112a are connecting portions through which the input-side conductor area expansion plate 141 and the neutral line input terminal 112 are electrically connected to each other.

A reference numeral 142 is an insulating case which supports the input-side conductor area expansion plate 141, a reference numeral 143 is an input terminal mounting part in which the input terminal 110 is accommodated to be mounted, and a reference numeral 144 is an insulating support which supports the input terminal 110 from below.

The output-side leakage current limiting part 150 is disposed between the earth leakage breaker part 130 and the output terminal 120 to limit an output-side leakage current. In this case, the output-side leakage current limiting part 150 includes an output-side conductor area expansion plate 151.

The output-side conductor area expansion plate 151 is electrically connected to the neutral line output terminal 122 to expand a conductor area of the neutral line output terminal 122, thereby limiting a leakage current. Reference numerals 151a and 122a are connecting portions through which the output-side conductor area expansion plate 151 and the neutral line output terminal 122 are electrically connected to each other.

A reference numeral 152 is an insulating case which supports the output-side conductor area expansion plate 151, a reference numeral 153 is an output terminal mounting part in which the output terminal 120 is accommodated to be mounted, and a reference numeral 154 is an insulating support which supports the output terminal 120 from below.

According to the above, in the present disclosure, since the conductor area of the neutral line input terminal 112 is expanded by the input-side conductor area expansion plate 141, the conductor area of the neutral line input terminal 112 becomes larger than a conductor area of the phase voltage line input terminal 111.

Further, in the present disclosure, since the conductor area of the neutral line output terminal 122 is expanded by the output-side conductor area expansion plate 151, the conductor area of the neutral line output terminal 122 becomes larger than a conductor area of the phase voltage line output terminal 121.

The leakage current is limited by an area difference between the phase voltage line input terminal 111 and the neutral line input terminal 112 having different areas and an area difference between the phase voltage line output terminal 121 and the neutral line output terminal 122 having different areas.

Since the leakage current gradually decreases when the area difference between two electrodes increases, and the risk of electric shock decreases when the leakage current decreases, a leakage current limiting function without concern for electric shock may be provided.

That is because, as disclosed in the Korean Application Patent No. 10-1404806 (May 30, 2014) mentioned in the conventional art, the leakage current gradually decreases when an area of a flat-shaped conductor connected to a negative terminal (corresponding to the neutral line input terminal and the neutral line output terminal of the present disclosure) is larger than an area of a flat-shaped conductor connected to a positive terminal of the power supply (corresponding to the phase voltage line input terminal and the phase voltage line output terminal of the present disclosure).

Accordingly, in the present disclosure, since the leakage current limiting parts at both ends of the earth leakage breaker part are implemented to have the leakage current limiting function at both the input terminal and the output terminal, and thus leakage current limiting efficiency may be increased, electric shock accidents may be more effectively prevented.

Meanwhile, according to an additional aspect of the present disclosure, the earth leakage breaker 100 provided with the leakage current limiting function further includes an enclosure 160. The enclosure 160 includes an enclosure base 161 and an enclosure cover 162 which are coupled to each other. A reference numeral 163 is a rubber packing which encapsulates the earth leakage breaker part 130 to prevent the introduction of moisture.

In this case, the enclosure 160 may be provided with a lattice type accommodation groove 163. In this case, the lattice type accommodation groove 163 may be formed in the enclosure base 161, and accommodates the earth leakage breaker part 130, and the input-side leakage current limiting part 140 and the output-side leakage current limiting part 150 disposed at both ends of the earth leakage breaker part in accommodation spaces 163a, 163b, and 163c which are separated from each other.

Accordingly, the input-side leakage current limiting part 140 and the output-side leakage current limiting part 150 are electrically isolated from the earth leakage breaker part 130 by the lattice type accommodation groove 163 formed in the enclosure 160 so that the input-side leakage current limiting part 140 and the output-side leakage current limiting part 150 do not electrically affect the earth leakage breaker part 130.

As described above, in the present disclosure, since the leakage current limiting parts at both ends of the earth leakage breaker part are implemented to have the leakage current limiting function at both the input terminal and the output terminal, and thus leakage current limiting efficiency may be increased, electric shock accidents may be more effectively prevented.

According to the present disclosure, there is an effect in that since leakage current limiting parts are implemented at both ends of an earth leakage breaker part to have a leakage current limiting function at both the input terminal and the output terminal, and thus leakage current limiting efficiency can be increased, electric shock accidents can be more effectively prevented.

The various embodiments disclosed in the specifications and the drawings are only specific examples for aiding understanding, and do not limit the scope of the various embodiments of the present disclosure.

Accordingly, it should be understood that all changes and modifications derived from technical spirit of the various embodiments of the present disclosure in addition to the above-described embodiments are included in the scope of the various embodiments of the present disclosure.

The present disclosure can be industrially used in a technical field related to an earth leakage breaker and an application field thereof.

What is claimed is:

1. An earth leakage breaker having a leakage current limiting function, comprising:
    input terminals including a phase voltage line input terminal connected to a phase voltage line of an input-side wire, and a neutral line input terminal connected to a neutral line of the input-side wire;
    output terminals including a phase voltage line output terminal connected to a phase voltage line of an output-side wire, and a neutral line output terminal connected to a neutral line of the output-side wire;
    an earth leakage breaker part having both ends to which the input terminals and the output terminals are respectively connected, and configured to block electrical connection between the input terminals and the output terminals when an overcurrent flows;
    an input-side leakage current limiting part disposed between the input terminals and the earth leakage breaker part to limit an input-side leakage current; and
    an output-side leakage current limiting part disposed between the earth leakage breaker part and the output terminals to limit an output-side leakage current,
    wherein the input-side leakage current limiting part has a large conductor area so that the conductor area of the neutral line input terminal is larger than a conductor area of the phase voltage line input terminal, thereby the input-side leakage current is limited by an area difference between the phase voltage line input terminal and the neutral line input terminal having different areas,
    wherein the output-side leakage current limiting part has a large conductor area so that the conductor area of the neutral line output terminal is larger than a conductor area of the phase voltage line output terminal, thereby the output-side leakage current is limited by an area difference between the phase voltage line output terminal and the neutral line output terminal having different areas,
    wherein the input-side leakage current limiting part includes an input-side conductor area expansion plate electrically connected to the neutral line input terminal,
    wherein the phase voltage line input terminal and the neutral line input terminal are disposed on a substantially same plane, and
    wherein the input-side conductor area expansion plate is disposed above and in parallel with the phase voltage line input terminal and the neutral line input terminal, respectively.

2. The earth leakage breaker of claim 1, wherein the output-side leakage current limiting part includes an output-side conductor area expansion plate electrically connected to the neutral line output terminal,
    wherein the phase voltage line output terminal and the neutral line output terminal are disposed on a substantially same plane, wherein the output-side conductor area expansion plate is disposed above and in parallel with the phase voltage line output terminal and the neutral line output terminal, respectively.

3. The earth leakage breaker of claim 2, comprising an enclosure provided with a lattice type accommodation groove configured to accommodate the earth leakage breaker part, and the input-side leakage current limiting part and the output-side leakage current limiting part disposed at both ends of the earth leakage breaker part in separated accommodation spaces so that the input-side leakage current limiting part and the output-side leakage current limiting part do not electrically affect the earth leakage breaker part.

4. The earth leakage breaker of claim 1, wherein the earth leakage breaker part includes an earth leakage breaker switch protected by a silicone film.

5. The earth leakage breaker of claim 4, comprising an enclosure provided with a lattice type accommodation groove configured to accommodate the earth leakage breaker part, and the input-side leakage current limiting part and the output-side leakage current limiting part disposed at both ends of the earth leakage breaker part in separated accommodation spaces so that the input-side leakage current limiting part and the output-side leakage current limiting part do not electrically affect the earth leakage breaker part.

6. The earth leakage breaker of claim 1, comprising an enclosure provided with a lattice type accommodation groove configured to accommodate the earth leakage breaker part, and the input-side leakage current limiting part and the output-side leakage current limiting part disposed at both ends of the earth leakage breaker part in separated accommodation spaces so that the input-side leakage current limiting part and the output-side leakage current limiting part do not electrically affect the earth leakage breaker part.

7. The earth leakage breaker of claim 1, comprising an enclosure provided with a lattice type accommodation groove configured to accommodate the earth leakage breaker part, and the input-side leakage current limiting part and the output-side leakage current limiting part disposed at both ends of the earth leakage breaker part in separated accommodation spaces so that the input-side leakage current limiting part and the output-side leakage current limiting part do not electrically affect the earth leakage breaker part.

8. The earth leakage breaker of claim 1, wherein the input-side leakage current limiting part further includes a first leg and a second leg which are connected to the input-side conductor area expansion plate, wherein the first leg and the second leg extend downward to support the input-side conductor area expansion plate.

9. The earth leakage breaker of claim 8, wherein the input-side leakage current limiting part further includes a third leg which is connected to the input-side conductor area expansion plate, wherein the third leg extends downward and is electrically connected to the neutral line input terminal,
the first leg is provided adjacent to the earth leakage breaker part, and the second leg is provided adjacent to the input-side wire,
a length of the third leg is shorter than the first leg.

10. The earth leakage breaker of claim 9, wherein the first leg comprises a middle body and a bottom portion, wherein the middle body connects the input-side conductor area expansion plate and the bottom portion, and a width of the bottom portion is thicker than a width of the middle body.

* * * * *